(No Model.)
J. E. DAVIS.
HOSE COUPLING.
No. 419,988.　　　　　Patented Jan. 21, 1890.
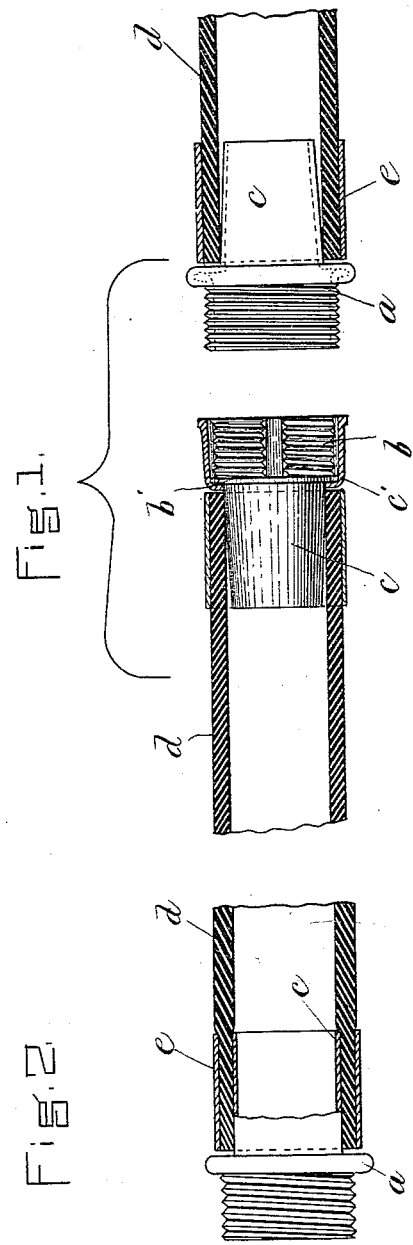
WITNESSES
A. D. Harrison.
W. C. Ramsay.
INVENTOR:
J. Edwin Davis
by Knight Bros & Crossley
Attys

UNITED STATES PATENT OFFICE.

JOSEPH EDWIN DAVIS, OF LYNN, MASSACHUSETTS.

HOSE-COUPLING.

SPECIFICATION forming part of Letters Patent No. 419,988, dated January 21, 1890.

Application filed March 21, 1889. Serial No. 304,094. (No model.)

*To all whom it may concern:*

Be it known that I, JOSEPH EDWIN DAVIS, of Lynn, in the county of Essex and State of Massachusetts, have invented certain new and useful Improvements in Hose-Couplings, of which the following is a specification.

This invention has for its object to provide improved means for securing flexible hose to the nipples of the couplings, which are employed to connect sections of such hose.

The invention consists in a coupling member provided with a sheet-metal nipple which is made tapering or frusto-conical in form, its inner end being larger than its outer end, the metal of which said nipple is made being sufficiently thin to enable the smaller outer end of the nipple to be enlarged within the hose placed thereon for the purpose of securing the hose to the nipple.

The invention also consists in the combination, with a nipple of the character above indicated, of an external ring adapted to inclose the end of said hose outside said nipple, so that when the nipple is expanded, as above indicated, the hose will be compressed between the expanded outer portion of the nipple and the inclosing-ring, as I will now proceed to describe.

In the accompanying drawings, forming a part of this specification, Figure 1 represents a side elevation of two separate members of a coupling provided with my improvement, one of said members being shown in section and the nipples of both members being shown in their original form before they are expanded to secure the hose. Fig. 2 represents a side elevation of one of said members, showing its nipple partly in section and expanded to clamp the end of the hose against the external inclosing-ring, said inclosing-ring and the hose being shown in section in both figures.

The same letters of reference indicate the same parts in all the figures.

In the drawings, $a$ represents the externally-threaded male member of the hose-coupling, and $b$ the internally-threaded female member of the same. The general construction of these members constitutes no part of my invention, and may be any construction suitable.

$c$ $c$ represent the nipples, which are secured to said members and are made of sheet metal, each being tapered and reduced in diameter from its inner end, which joins the coupling member to which it belongs to its outer end, which enters and is expanded in the hose-section $d$. In other words, each nipple $c$ is a cone-frustum of sheet metal, the smaller end being the outer.

$e$ represents the inclosing-ring, which is placed on the end of the hose $d$, and is of such diameter as to closely fit the latter, the hose being of such thickness that when placed upon the nipple $c$ it bears closely on the larger inner end of the nipple.

In securing the hose to the coupling member after the hose $a$ and ring $b$ have been applied to the nipple, as shown in Fig. 1, any suitable instrument is inserted in the nipple $c$ and the nipple thereby expanded, as shown in Fig. 2, until its outer end is of substantially the same diameter as its inner end. The hose is thereby compressed between the nipple and the inclosing-ring and is firmly secured to the coupling member. It will be seen that by this improvement the hose can be quickly and firmly secured to the coupling.

The cost of the coupling provided with my improvement is small, the sheet-metal nipple being constructed with the minimum of metal, as also is the inclosing-ring $e$. The nipple may be formed as a part of the coupling member or it may be made in a separate piece suitably engaged therewith. In Fig. 1 I show the nipple $c$ as an integral part of the coupling member $a$, the whole being formed of sheet metal. In Fig. 1 I show the nipple provided with an outwardly-projecting flange $c'$, at its inner end engaging an inwardly-projecting flange $b'$ on the member $b$, which last-described engagement enables the nipple to rotate independently of the member $b$.

It will be observed that the tapering form of the nipple enables it to be easily inserted in the end of the hose.

I am aware that it has been proposed to introduce a tapered binding-ring into a hose and to expand said ring and thereby compress the hose between the ring and an outer binding-ring attached to the coupling; but in the coupling having said binding-rings the inner tapered ring was not formed as a part of the member of the coupling, but was made as an independent part and had to be secured thereto by the outer binding-ring, which was screw-threaded to engage said coupling member. The said rings therefore have to be attached to the hose before they are secured to the coupling member. In my coupling the tapered nipple is a structural part of the coupling member, so that the operation of expanding the nipple in the hose also secures the coupling member to the hose.

I am also aware that it has been proposed to expand a thimble in the end of a length of hose and thereby expand the hose into a tapered socket which is larger at its inner end than the original diameter of the hose, so that the hose is stretched or distended, and therefore loses a portion of its expansive force or power, and the diameter of the coupling made considerably greater than that of the hose in its normal condition. In my coupling the rings $e$ are of such internal diameter as to closely fit the normal diameter of the hose, so that there is no stretching or distention of the hose by the expansion of the nipples.

I claim as my invention—

1. In a hose-coupling, the combination of the loose or independent ring $e$, formed to inclose and closely fit the end of the length of hose, a coupling member, and a sheet-metal nipple $c$, formed on or secured directly to said member, said nipple being expanded within the hose and within the ring $e$ after said ring is applied to the hose, whereby the end of the hose is clamped between said nipple and ring without being distended, as set forth.

2. In a hose-coupling, the combination, with the male and female members $a$ $b$, of the sheet-metal nipples $c$, formed with or as parts of said members and reduced in diameter from their inner to their outer ends, said nipples being adapted to be inserted in the hose, and the loose or independent rings $e$ $e$, adapted to be placed upon the ends of the hose in which the nipples $c$ are inserted to support the hose against the outward pressure caused by expanding said nipples, said rings being of such internal diameter as to fit closely the exterior of the hose, so that the hose is not distended by the expansion of the nipples within it, as set forth.

In testimony whereof I have signed my name to this specification, in the presence of two subscribing witnesses, this 19th day of March, A. D. 1889.

J. EDWIN DAVIS.

Witnesses:
A. D. HARRISON,
W. C. RAMSAY.